(12) United States Patent
Wiklund

(10) Patent No.: US 6,199,947 B1
(45) Date of Patent: Mar. 13, 2001

(54) VEHICLE SEAT PROVIDED WITH A HEADREST

(75) Inventor: Kristina Wiklund, Trollhattan (SE)

(73) Assignee: SAAB Automobile AB (SE)

( * ) Notice: Subject to any disclaimer, the term of this patent is extended or adjusted under 35 U.S.C. 154(b) by 0 days.

(21) Appl. No.: 09/560,251

(22) Filed: Apr. 28, 2000

Related U.S. Application Data

(63) Continuation of application No. 09/254,341, filed as application No. PCT/SE97/01487 on Sep. 5, 1997, now abandoned.

(30) Foreign Application Priority Data

Sep. 6, 1996 (SE) .................................................. 9603238

(51) Int. Cl.[7] ............................ B60R 21/055; B60N 2/48
(52) U.S. Cl. ...................................... 297/216.12; 297/408
(58) Field of Search ............................... 297/216.17, 391, 297/408

(56) References Cited

U.S. PATENT DOCUMENTS

| | | | |
|---|---|---|---|
| 3,802,737 | * | 4/1974 | Mertens ........................... 297/216.12 |
| 5,378,013 | * | 1/1995 | Viano et al. ........................... 297/408 |
| 5,823,619 | * | 10/1998 | Herlig et al. ..................... 297/216.12 |

* cited by examiner

Primary Examiner—Peter R. Brown
(74) Attorney, Agent, or Firm—Ostrolenk, Faber, Gerb & Soffen, LLP

(57) ABSTRACT

A vehicle chair has a neck support (4), which by means of a support mechanism (5) is mounted movable relative to the back (3) of the chair, so that during rear end collisions with the help of the back of the traveller and a maneuvering means (10) in the chair to be forced forwards in order to meet and intercept the head of the traveller. This maneuvering means (10) is connected to the frame (9) in the back of the chair by means of a link mechanism (11), wherein the connection (13) of the link mechanism (11) to the frame (9) is situated higher than the connection (14) of the link mechanism (11) to the maneuvering means (10).

13 Claims, 2 Drawing Sheets

VEHICLE SEAT PROVIDED WITH A HEADREST

This is a continuation of application Ser. No. 09/254,341, filed Jul. 12, 1999, now abandoned, which is a 371 of PCT/SE97/01487, filed on Sep. 5, 1997.

TECHNICAL FIELD

The present invention relates to a vehicle chair provided with a neck support which is adapted to shift up and forward upon a rear end collision and to a neck support moving mechanism.

STATE OF THE ART

One of the most common types of personal injury in traffic today is neck injuries, so-called whiplash injuries. These injuries occur usually during rear end collisions, often at low speeds. The neck or cervical column of the traveller is thereby subjected to abnormal stresses but there is still no complete knowledge on which movements in a complicated pattern of movements actually damage the neck. It is, however, known, on the one hand, that no injuries occur if the traveller has effective support for both the body and the head during a collision and, on the other hand, that violent relative movement between the body and the head give rise to injuries on the inter-mediate vertebrae, ligaments and other types of tissue.

The appearance of neck supports on vehicle chairs has been a link in the efforts to reduce such injuries. These neck supports have had different shapes and been made adjustable in the vertical direction. It is also known from U.S. Pat. No. 5,378,043, with the help of a manoeuvering mechanism which is influenced by the back of the traveller during collisions, to move a neck support from a position a long way back to a position further forwards and somewhat higher in order to better meet and receive the head of the traveller. The arrangement is, however, with a stiff backplate and guide rails for the movement of the plate relative to the frame of the chair, such that the comfort is unsatisfactory and the friction high. Furthermore, the constituent components of the mechanism require a lot of space inside the backrest behind the back of the traveller.

OBJECTS OF THE INVENTION

The invention aims to provide a vehicle chair which in a better way than previously can protect a traveller against whiplash injuries.

Yet another object is to provide a vehicle seat which, despite the presence in the backrest of a mechanism for the moving of the neck support, feels comfortable for the traveller.

Yet another object is to provide a design which without special measures permits the renewed use of the mobility of the neck support.

DESCRIPTION OF THE INVENTION

In accordance with the invention the stated objects are achieved through the vehicle chair being designed according to the characterizing part of claim 1.

chair having a neck support, a maneuvering means for maneuvering the neck support and a support mechanism between the neck support and the maneuvering means, wherein the support mechanism is movably and tippably mounted in the support means on an upper fixed part of the frame. The lower end of the maneuvering means faces away from the neck support and is articulately connected to a frame by a link mechanism wherein the connection of a link mechanism to the frame is higher than the connection of the link mechanism to the maneuvering means and the maneuvering means has a normal position when the neck support is held in the rest position and the movement of the link mechanism pushes the head upward and forward manner stated to the frame in the back of the chair by means of a link mechanism, an advantageous pattern of movement for the neck support is permitted so that it can move sufficiently far forwards in order to form an effective support for the head of the traveller during rear end collisions. It also becomes possible to divest the supporting part of the back of the chair from parts which can be experienced as hard and uncomfortable by the traveller. These pieces can now be placed completely within the sides of the frame in the back.

The arrangement also provides the use of a type of spring which easily can be placed along the sides of the frame, which simplifies the construction. These springs can advantageously be selected to that a precise minimum force on the manoeuvering means must be achieved before the neck support can be moved. The chair thereby feels stable during normal use.

During a collision the back of the chair will be sprung backwards relative to the seat to an extent which depends on the force of the collision and the weight of the traveller. The design of the support mechanism makes it possible to thereby distribute the absorption force on the traveller so that the head and back are subjected to the smallest possible mutual movement from a normal position during travelling. This is advantageous from the point of view of risks of injury. The body of the traveller is permitted through the movable manoeuvering means to sink into the chair until the head comes into contact with the neck support. In this way the wave which otherwise would go through the neck of the traveller when the shoulders meet a hard chair back, before the head has yet received any support, is avoided.

Other advantages and features of the invention are evident from the description below.

DESCRIPTION OF PREFERRED EMBODIMENTS

Figure 1:
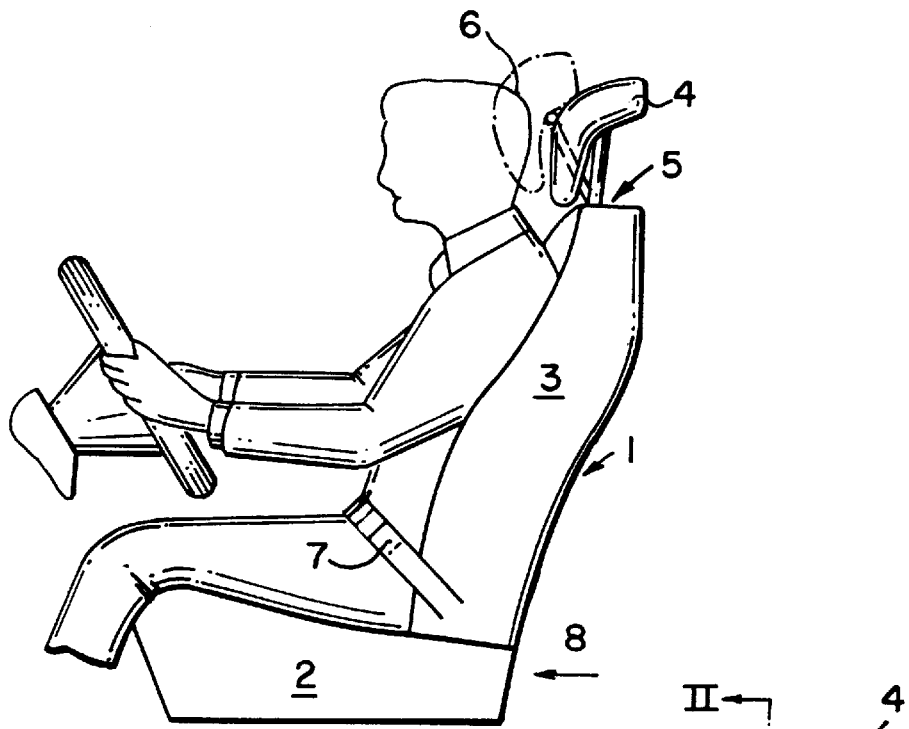
FIG. 1 shows a lateral view of a vehicle chair according to the invention with a driver.

As is shown in FIG. 1, a vehicle chair 1 according to the invention, in this case a driver's chair, is provided with a seat 2 and a back 3. A neck support 4 is by means of a support mechanism 5 attached to the back 3 and can in the customary way be adjusted to different height positions in order to end up in the correct position relative to the head of a person sitting in the chair. With the help of a safety belt 7 the person sitting in the chair can fasten himself in, in order to minimize the risk of injuries in a possible collision.

Based on previous experience it is desirable for the sake of comfort to normally have a certain distance between the head 6 and the neck support 4. A consequence of this it, however, that during a possible rear end collision, often at fairly low speeds, when the chair 1 is subjected to a force in the direction of the arrow 8, the risk for so-called whiplash injuries on the person in the chair occurs. Through designing the neck support 4 to be movable in a special way during a rear end collision in accordance with FIG. 1, it is possible according to the invention to minimize the risk for whiplash injuries in comparison with the prior art. This is achieved through the person sitting in the chair being caught up by the chair and with his back presses in towards the back of the chair, which influences the support mechanism 3 for the neck support 4 to move forwards and upwards relative to the chair to the position shown by dashed lines, so that the head 6 receives support. The cervical column of the person in this way obtains a considerably more advantageous loading from the point of view of injury than otherwise.

Figure 2:
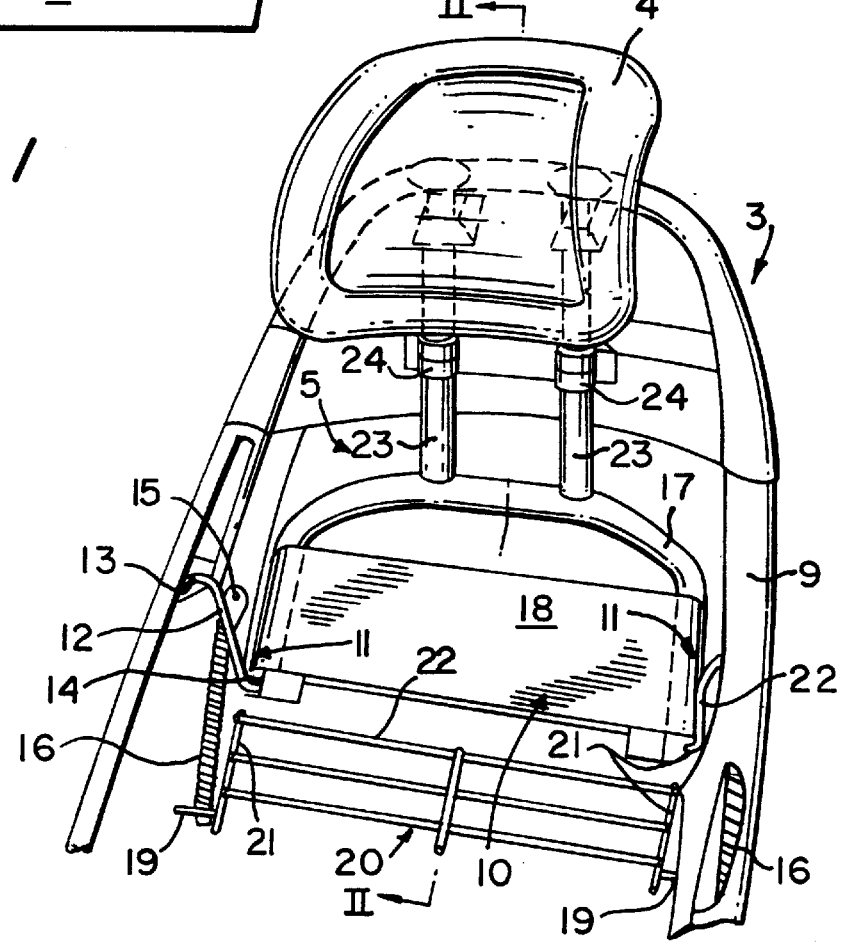
FIG. 2 shows a perspective view of the supporting parts in the upper part of a vehicle chair according to the invention, with the upholstery of the chair removed.

The detailed construction of a vehicle chair 1 according to the invention is evident from FIG. 2, where for the sake of illustration the upholstery, stuffing etc. of the chair has been left out. The back 3 of the chair has a frame 9, e.g. of pressed steel, which supports the support mechanism 5 which in turn supports the neck support 4. In the support mechanism 5 is comprised a manoeuvering means 10 arranged in the back 3 of the chair which via a link mechanism 11 is articulately connected to the frame 9. In this link mechanism 11 are comprised two link arms 12, one on each side of the manoeuvering means 10. Both these link arms 12 have, on the one hand, an articulated connection 13 to the frame 9 and, on the other hand, an articulated connection 14 to the manoeuvering means 10. On each of the link arms 12 there is an attachment 15 for one end of a spring 16, in this case a tension spring, which with its other end is fastened to the frame 9. With the help of the two springs 16 the manoeuvering means 16 is biased to its rest position shown in FIG. 2, where the neck support 4 also is in its rest position.

The manoeuvering means 10 has a frame part 17, shaped as an upside down U between the arms of which there is a support means 18, which is constituted as a supporting element in the back of the chair. This support means 18 can advantageously be made of a band with suitable stiffness and elasticity, e.g. a textile band which runs around the arms of the frame part 17. Below the support means 18 there is a back element 20 elastically fixed in a conventional way by means of springs 19 on both sides of the frame 9, which are included as a supporting element in the back of the chair. This back element 20 can, for example, as shown here be formed of two rod-shaped side elements 21 between which wires 22 are tensioned in the horizontal direction.

In the support mechanism 5 there are further comprised two elongated holders 23 fastened on top of the manoeuvering means 10 which join the neck support 4 to the manoeuvering means 10. These two holders 23 are each movably mounted in their own appropriate support 24 arranged on the frame 9.

Figure 3:
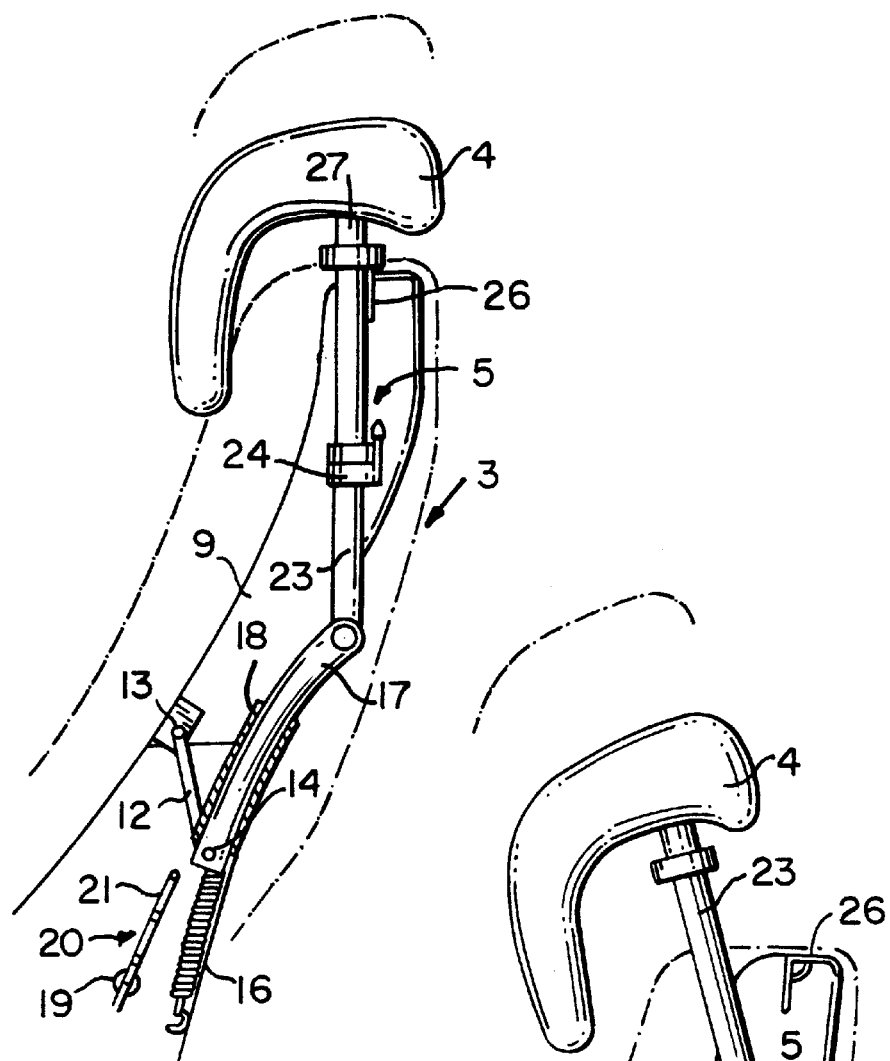
FIG. 3 shows a section along the line III—III in FIG. 2, with the neck support in the normal rest position.

In the rest position for the manoeuvering means 10 shown in FIGS. 2 and 3, the rearward movement for the neck support 4 is limited by the holders 23 at their upper ends being supported against an upper part 26 of the frame 9. The springs 16 are advantageously selected to be so powerful that normal loadings on the manoeuvering means 10 only cause inconsequential movement of the manoeuvering means 10.

Figure 4:
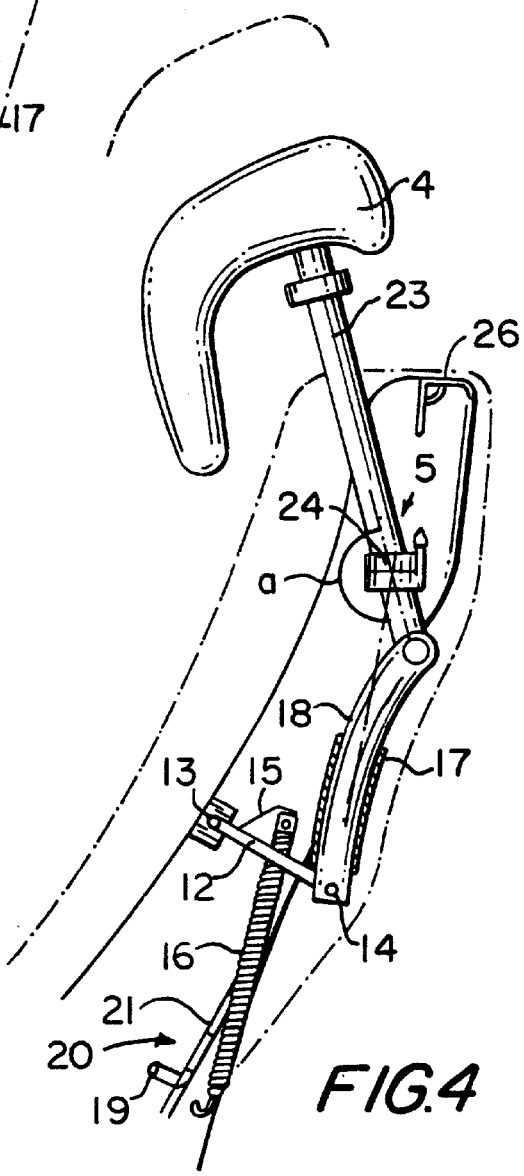
FIG. 4 shows the same section as in FIG. 3, but with the neck support in the activated position during a rear end collision.

As is evident from FIG. 3, the articulated connection 13 of each of the link arms 12 in the link mechanism 11 to the frame 9 is situated higher than the corresponding articulated connection 14 to the manoeuvering means 10. Furthermore, the articulated connection 13 is situated further forward in the chair than the articulated connection 14. In this way, during a rear end collision, the support mechanism 5 can be made to take up the position shown in FIG. 4, where the neck support 4 has been moved forwards and upwards relative to the back 3 in order to support the head 6 of the person in the chair. During such a rear end collision the manoeuvering means 10 is subjected to such a large force backwards relative to the frame 9 by the back of the person that it is moved and, with the help of the link arms 12, guided in such a way that the holders 23 slide upwards in the support 24 at the same time as they are bent forwards. In connection with such a movement the back element 20 is also pressed backwards from its normal position in FIG. 3, in the course of the extension of the springs 19, whereby the back of the person is well supported.

In a vehicle chair according to the invention, as mentioned earlier, the intention is that the manoeuvering means 10 normally should be held in the normal position where the neck support 4 is in the rest position. This can also be achieved in other ways than that according to the embodiment shown. A possibility is, for example, to change the spring attachment so that each spring, instead of being connected with one end to a link arm, is connected directly to the manoeuvering means 10. Another possibility is that on each side of the manoeuvering means 10 instead of a tension spring to use a compression spring, or another type of spring, placed appropriately. Even other embodiments which give the intended movement resistance for the manoeuvering means are conceivable within the scope of the invention. It would also be possible to have a suitable locking mechanism between the manoeuvering means 10 and the frame 9 which releases the manoeuvering means only when a certain load level has been reached.

It is, especially for reasons of comfort, desirable that the manoeuvering means 10 cannot move backwards too easily, but for reasons of safety it must not require too high a load to move the manoeuvering means 10. In the embodiment shown it has been shown to be suitable for the activation of the neck support to require a load on the manoeuvering means 10 of at least 100N. With the same testing method the neck support must be able to be activated by a load which does not exceed 160N. Changing the geometry in the chair naturally results in that another suitable size of the required load may be required.

The angle α (FIG. 4) formed as seen from the side between the manoeuvering means 10 and the holders 23 is obtuse and is so selected that the holders 23 become essentially vertical with the normally used backrest inclination. The supports 24 are above and behind the articulated connection 13 between the link arm 12 and the frame 9. The articulated connection 14 between the link arm 12 and the manoeuvering means 10 is advantageously always in front of the supports 24. As is evident from FIGS. 2–4, the supports 24 further are relatively low down on the frame 9, at a level below its upper edge. This results, according to FIG. 4, in that for a relatively limited movement backwards for the manoeuvering means 10, a relatively large movement forwards for the neck support 4 is obtained, i.e. the movement ratio is good. Consequently, in comparison with a higher placement of the supports 24, from a point of view of risk of injury, in this way a more advantageous pattern of movement for the neck support 4 is obtained.

The placement of the holders 23 in a position well behind the support means 18 of the manoeuvering means 10 ensures that the traveller will not come into contact with the holder 23 and will not risk being injured by them.

The geometric proportions shown can naturally be varied within the scope of the invention. It is, however, important that the supports 24 are a relatively long distance away from the neck support 4 when this is in the rest position, in order to obtain an advantageous pattern of movement for the neck support.

After a rear end collision, the manoeuvering means 10 can, without any special action, because of the influence of spring power, be returned to its starting position, ready to once again come into use. In an extremely powerful collision, the frame part 17 can possibly be deformed through its arms, as a consequence of the large load on the supporting means 18, being bent together. This gives an extra energy absorption with the aim of protecting the traveller.

The neck support 4 has a design which gives an effective support to the skull and has advantageously such a structure that the skull bounces as little as possible when it meets the neck support. In a lower position for the neck support 4, a holder part 27 (FIG. 3) is almost completely inserted into the holder 23 but it can be pulled out in order to adjust the neck support to a higher position.

What is claimed is:

1. A vehicle chair comprising:
   a chair back;
   a support mechanism at the chair back;
   a neck support mounted on the support mechanism;
   a neck support maneuvering means arranged in the back of the chair to be pressed rearwardly by a person sitting in the chair and being connected to the neck support to move the neck support forward and upward to meet the head of a person in the chair in the event of a collision with the vehicle; the support mechanism is between the neck support and the maneuvering means;
   support means on the frame to which the support mechanism is mounted;
   the maneuvering means having a lower end facing away from the neck support and the maneuvering means being articulately connected to the frame in the back of the chair, a link mechanism between the maneuvering means and the frame for providing the articulated connection, the link mechanism being connected to the frame and to the maneuvering means wherein the connection of the link mechanism to the frame is situated higher than the connection of the link mechanism to the maneuvering means, and the maneuvering means having a normal position when the neck support is held in the rest position.

2. The vehicle chair of claim 1, wherein the connection of the link mechanism to the frame is also situated forward of the connection of the link mechanism to the maneuvering means.

3. The vehicle chair of claim 2, further comprising a spring loading the maneuvering means to the normal position.

4. The vehicle chair of claim 3, wherein the spring is connected to the link mechanism to spring load the maneuvering means to the normal position.

5. The vehicle chair of claim 4, wherein the link mechanism comprises a first and a second link arm, each on a lateral side of the maneuvering means, each link arm being connected to the frame on the one hand and to the maneuvering means on the other hand.

6. The vehicle chair of claim 5, further comprising a spring attachment on each link arm between the connection points to the frame and the maneuvering means, a respective one of the springs attached to each of spring attachments on the one hand and to the frame on the other hand for loading the link arm and thereby loading the maneuvering means to a position where the neck support is held in the rest position.

7. The vehicle chair of claim 5, wherein each spring is a tension spring having an end which is fastened in the frame at a location lower than the link arm associated with the tension spring.

8. The vehicle chair of claim 5, wherein the maneuvering means includes a frame shaped as an inverted U having arms; back supporting means between the arms of the U.

9. The vehicle chair of claim 8, wherein each arm of the U has an end and the end of each arm is connected to a respective one of the link arms at that side of the frame.

10. The vehicle chair of claim 1, wherein the maneuvering means includes a frame shaped as an inverted U having arms; back supporting means between the arms of the U.

11. The vehicle chair of claim 1, wherein the support mechanism comprises two elongated holders attached above the maneuvering means, the neck support being supported upon the elongated holders;
    supports on the frame in the back of the chair for the elongated holders and supporting the holders for being movable in order to permit the support mechanism and the neck support to move relative to the back of the chair.

12. The vehicle chair of claim 11, wherein the supports in the chair are positioned further back and higher up on the frame than the link mechanism.

13. The vehicle chair of claim 11, wherein the frame has an upper edge and the supports are attached to the frame at a level under the upper edge of the frame.

* * * * *